United States Patent [19]

Benkert

[11] 4,356,992
[45] Nov. 2, 1982

[54] EARTHQUAKE PROTECTED VIBRATION ISOLATOR

[76] Inventor: Donald E. Benkert, 1234 Blair Ave., South Pasadena, Calif. 91030

[21] Appl. No.: 181,049

[22] Filed: Aug. 29, 1980

[51] Int. Cl.³ .............................................. F16F 1/06
[52] U.S. Cl. ..................................... 248/578; 248/573
[58] Field of Search ................. 248/573, 575, 576, 578

[56] References Cited

U.S. PATENT DOCUMENTS

| | | | |
|---|---|---|---|
| 2,373,125 | 4/1945 | Loepsinger | 248/573 |
| 2,823,882 | 2/1958 | Ross | 248/578 |
| 2,852,223 | 9/1958 | Roberts | 248/578 X |
| 2,979,297 | 4/1961 | Suozzo | 248/575 X |
| 3,291,249 | 12/1966 | Bays | 248/573 X |
| 3,348,796 | 10/1967 | Baratoff et al. | 248/575 X |
| 4,069,992 | 1/1978 | Lada | 248/573 X |

Primary Examiner—Roy D. Frazier
Assistant Examiner—Peter A. Aschenbrenner
Attorney, Agent, or Firm—Wm. Jacquet Gribble

[57] ABSTRACT

An upper member to which a machine or other equipment piece to be protected is securable is supported directly or indirectly upon one or more resilient support columns, like coil springs. The resilient support columns are supported from a lower member which is adapted to be fixed to the load supporting surface for the equipment. Downwardly extending looping surfaces secured to the upper member define open or closed loops about transverse horizontal restraint bolts secured in pairs of transversely separated jaws rising from the lower member at each end of the member. The looping surfaces and the restraint bolts serve to limit relative motion in the transverse and longitudinal directions between the upper and lower members. Shock cushions about each bolt and between the looping surfaces and the jaws further limit relative motion. Each resilient support column or spring has a load adjusting threaded assembly coaxially arranged centrally of the spring and secured at one end to a member, with threaded thrust units to contact an end of the column to adjust static loads on the column. The looping surfaces may be removably secured to the upper member and may define open troughs or closed loops about the bolts.

17 Claims, 9 Drawing Figures

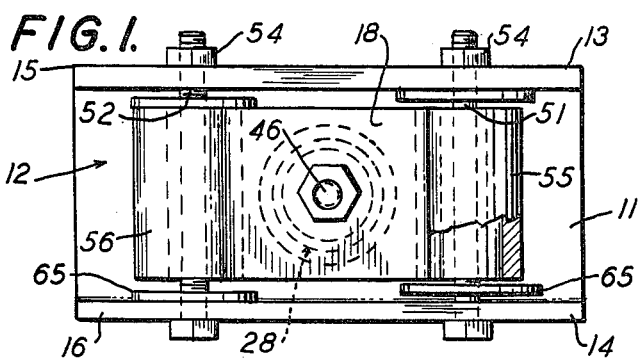
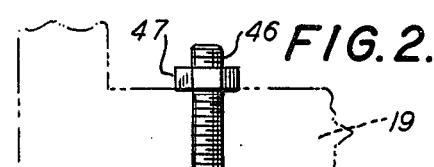
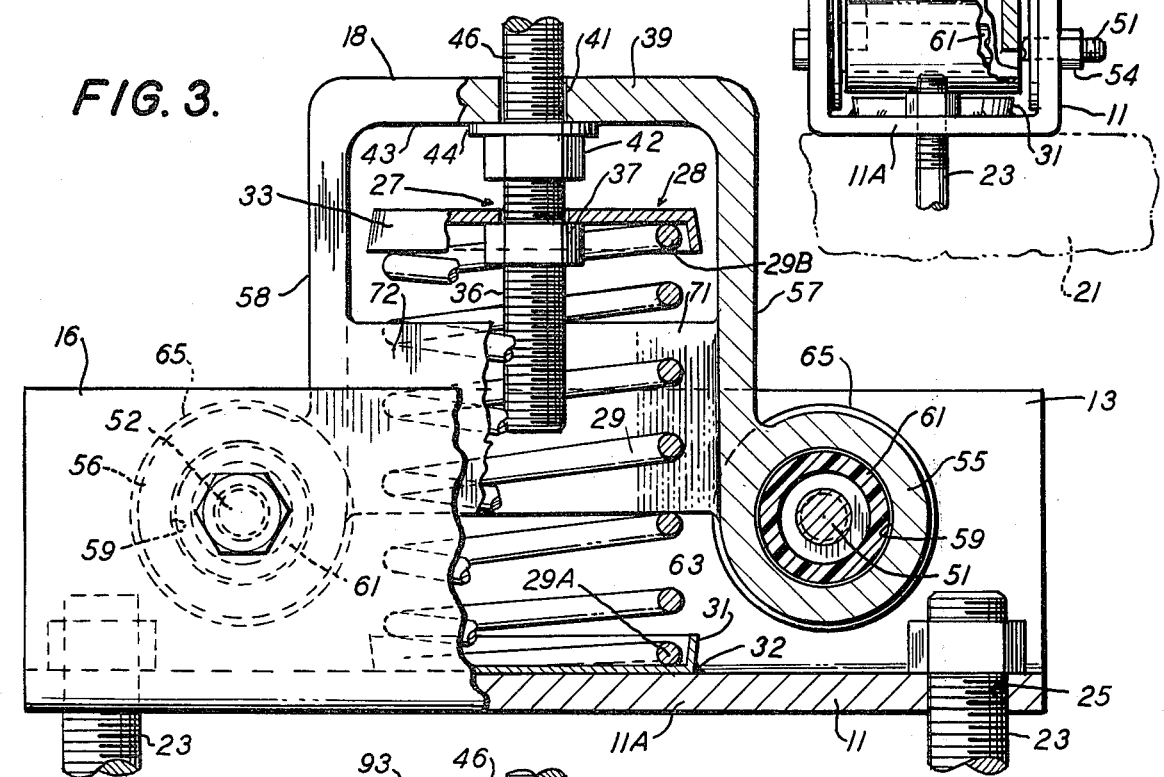
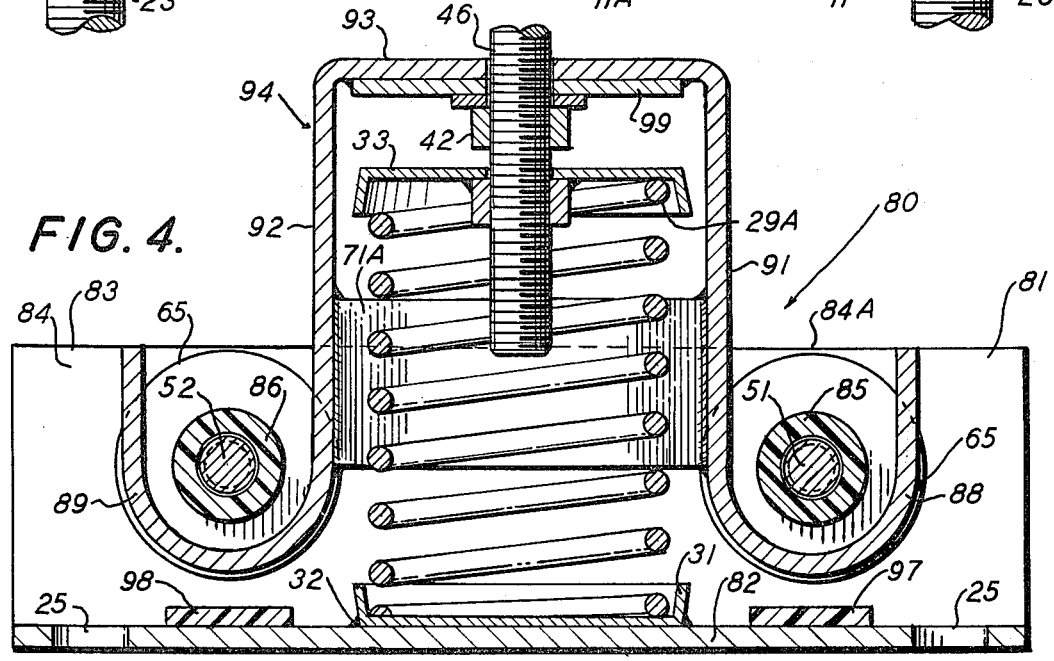

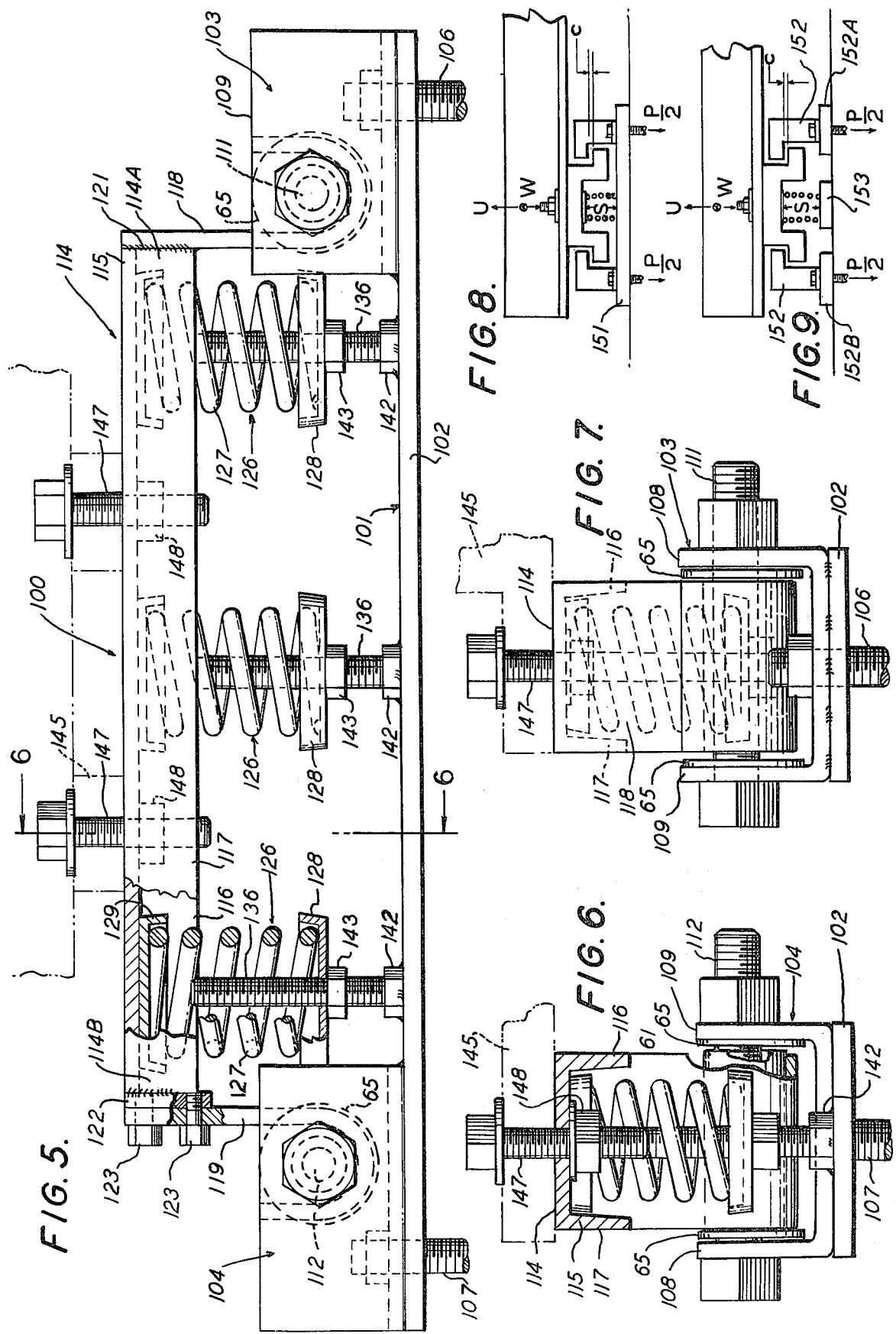

EARTHQUAKE PROTECTED VIBRATION ISOLATOR

BACKGROUND OF THE INVENTION

In California, and increasingly in other earthquake-prone states, laws requiring that certain types of equipment installed in hospitals, schools and other public buildings be protected from earthquake caused damage are prevalent. Vibration isolated equipment often is accorded special legal scrutiny.

All equipment with rotating or reciprocating masses or oscillating magnetic fields exhibits vibratory forces which are frequently small enough to allow rigid attachment of such equipment to structures without consequent problems. If the structure containing the equipment is subjected to earthquake induced motions the rigidly attached equipment is normally considered to be protected from earthquake induced damage because said equipment moves in concert with the structure without falling, walking or colliding, assuming the attachments, floors and equipment are structurally adequate. But equipment in many installations is deemed to create excessive vibratory forces while operating if it is rigidly attached to its support surface. It is common practice to support excessively shaky, rigidly framed, equipment on resilient devices to cushion the structure from the vibratory forces and thereby enable day-to-day operation of otherwise unacceptable equipment. Unfortunately this equipment supported by resilient devices is vulnerable to earthquake-induced damage unless motion inhibiting devices are utilized. Common practice is to limit motion of resiliently supported equipment with stops anchored to the floor to limit equipment motion without actually touching the equipment during day-to-day operation. Earthquake. induced motions are thus minimized without compromising day-to-day equipment operation.

There are two different approaches to earthquake protection of resiliently supported equipment, the first of which aims to restrain equipment motion with devices acting directly upon a structurally adequate member of the equipment at locations remote from the load support points. However, such remote restraints are denied the benefit of equipment weight, require added anchor points, are more likely to be jammed since additional anchor devices naturally require more care to align properly. The added anchors cannot be at the structurally more desirable locations at the equipment corners since the corners are normally assigned to the resilient load supporting devices. The unavailable corner locations are also the most desired motion limiting locations since equipment motions are greatest there. In addition locations other than the corners are denied obvious proof of sufficient structural integretry to provide at least one times the force of gravity upward at the contact points that accrues when load support and contact restraint points are combined at the same locations. The resulting appearance of limiting devices remote from load support points is unprofessional, presenting a "scabbed on" aspect, as if restraint were added as an afterthrought. The described first approach results in high costs because of inefficient utilization of materials by having duplication of elements, which is avoidable.

The instant invention, by using a second approach, obviates these difficulties and objections by restraining motion with devices designed to support and restrain in complete integrated support and restraint apparatus units taking advantage of the weight of the supported load to minimize "pullout" loads on the anchors holding the combined device to the support surface.

While there are a number of existing designs featuring earthquake protection and vibration isolation integrated in a single device, some lack totally desired shock cushioning while others lack sufficient contact surface area for proper bearing pressures to avoid cutting shock cushions during an earthquake. Some existing devices have contact surfaces for the restraints high above the floor or other load support surface, causing undesirably high pullout loads on floor anchors. Conventional protective devices for equipment hide the shock cushions that do exist behind immovable structure members, thus preventing shock cushion inspection without the complete disassembly or removal of the protective device, while other devices so position the cushions that service again requires complete removal and disassembly of the device.

Like an untested fire hose in a building awaiting its call to serve, earthquake protection equipment is virtually untested until called upon to perform in the undeterminable future. Thus, proper design should feature ease of inspection, accessibility and of replacement of aged, cracked or hardened shock cushions, which have an average life of ten years.

SUMMARY OF THE INVENTION

The instant invention uniquely utilizes parallel horizontal restraint bolts removably attached to a floor attached load supporting lower member. An upper member adapted to be secured to the protected equipment has downwardly extending elements interposed between transversely separated lower member jaws at each end of the lower member. The jaws limit horizontal motion parallel to the restraint bolts. The upper member, by its downwardly extending elements, which loop around the bolts, limits motion in a plane perpendicular to the restraint bolts. A resilient support column supports the upper member from the lower member, directly or indirectly. The resilient support column may be a metal coil spring, a rubber or "Neoprene" element, or a column of cork. Column loading members secured to one of the lower or upper members have threaded thrust units adapted to adjust the load on the column. Proper clearances between upper member and adjacent restraint bolts, jaws and lower member can be established to provide satisfactory day-to-day vibration isolation performance. Preferably shock cushions intervene between motion restraining surfaces of the apparatus for further cushioned limitation on relative movement of the upper and lower members.

Threaded assemblies or units using bearing cups and fixed and adjustable nuts provide for adjusting the static load on the resilient column. The threaded assemblies may be fixed centrally of the resilient support column by attachment to either the upper or the lower member.

The utilization of parallel horizontal bolts for the restraint means allows placement of the bolts in the lower member close to the load support surface or floor to minimize the distance above the support surface to the centers of pressure of the apparatus contact surfaces. Pullout loads on anchors fixing the isolator lower member to the floor are thus minimized and the effectiveness of mounting is improved because the floor is often the weakest element in the scheme of protection, and is also the most costly to improve upon unless the mounting apparatus is assisted by utilization of equipment weight upon the restraint and the lowering of contact points as much as possible. These steps thus reduce the size and the numbers of anchors required to provide proper protection and eliminate the need to cast steel beams in concrete load supporting surfaces in most instances.

These and other advantages of the invention are apparent from the following detailed description and drawing.

BRIEF DESCRIPTION OF THE DRAWING

FIG. 1 is a plan view to a reduced scale, partly in section, of an earthquake protected vibration isolator in accordance with the invention;

FIG. 2 is a side elevational view of the embodiment of FIG. 1, partly in section;

FIG. 3 is a front elevational view of the embodiment of FIG. 1, partly in section and to a larger scale;

FIG. 4 is a longitudinal sectional elevational view of an alternate embodiment of the invention;

FIG. 5 is a front elevational view, partly in section, of a further alternate embodiment of the invention employing a plurality of resilient support columns;

FIG. 6 is a transverse sectional elevational view taken along line 6—6 of FIG. 5;

FIG. 7 is a right end elevational view of the embodiment of FIG. 5;

FIG. 8 is a schematic diagram representing the forces involved in the use of an isolator in accordance with the invention; and FIG. 9 is a schematic diagram representing the forces involved in the use of an isolator with separate snubbers.

In the various Figures like parts are identified by like reference numbers.

DESCRIPTION OF THE PREFERRED EMBODIMENTS

The embodiments of FIG. 1 and FIG. 4 differ in the arrangement of shock cushions and materials of fabrication but the theory of operation is similar. In the embodiment of FIG. 1 a lower member 11 of an earthquake protected vibration isolator 12 has transversely separated vertical jaws 13, 14 and 15, 16 rising from a lower member base plate 11A. The jaw pairs may be separate but in FIGS. 1 and 4 the jaws 13 and 15 and 14 and 16 are unitary. The lower member therefore has the configuration of a conventional channel iron.

An upper member 18 is adapted to receive the load of the equipment, which is shown fragmentarily in FIG. 2 by broken lines 19. Both the equipment and isolator 12 are supported on a floor 21 also shown in broken lines. The floor or other load supporting surface is normally of cast concrete.

Lower member 11 is fixed to floor 21, a representative support surface, by an anchor bolt 23 at each end. The anchor bolts usually engage expansion inserts or other conventional threaded fasteners cast in place in the concrete surface. The anchor bolts reside in vertical orifices 25 of base plate 11A of the lower member.

As can be seen in FIG. 3, upper member 18 is supported in part by a threaded assembly 27 that is part of a resilient support column 28 seated on base plate 11A. In the embodiment of FIGS. 1 and 4 the resilient support column includes a metallic compression spring 29, although the invention does not preclude the use of solid and semi-solid support columns of rubber, "Neoprene" rubber, cork or other compressible resilient materials. In the embodiment of FIG. 1 the column spring 29 has a bottom turn 29A restrained horizontally in an bearing cup 31 which may be fixed, as by welding, at 32 to the base plate of lower member 11. An inverted bearing cup 33 confines the upper turn 29B of the column spring and is threadedly engaged with threaded stud 36 by means of a nut 37 fixed to cup 33 centrally thereof to turn therewith. Threaded stud 36 extends upwardly through a top web 39 of upper member 18 through a web aperture 41. An adjustment nut 42 separated from the underside 43 of bearing cup 33 by a thrust washer 44 provides for displacement of bearing cup 33 with respect to upper web 39 of the upper member. An outward extension 46 of the stud 36 is combined with a nut 47 to secure equipment 19 to upper member 18.

It can be seen that the static load on column spring 29 may be adjusted either by displacing nut 42 or upper bearing cup 33 as nuts 42 and 37 are adjusted longitudinally of threaded stud 36. The adjustment of nuts 37 and 42 affects the static load on column spring 29 but also affects the relationship of upper member 18 to a pair of restraint bolts 51, 52, which extend horizontally between the jaws of the lower member and are removably secured in the jaws by nuts 54. The relationship of the upper member to the lower member is determined in part by restraint bolts 51, 52 since the bolts are surrounded by cylindrical loops 55, 56, respectively, of separate downwardly extending looping surfaces 57, 58 of the upper member. The loops 55, 56 are each concentric with a bolt 51 or 52 and each loop houses a cylindrical shock cushion 61 which has an internal wall 63 concentric with a bolt and spaced from the bolt periphery. In the FIG. 3 embodiment be regarded as a full scale representation of the earthquake protected vibration isolator of the invention, then the clearance between the bolt periphery and the internal wall of the shock cushion is about one-eighth of an inch (3.2 mm). The relationship of the looping surface loops 55, 56 and the cushions 61 to the bolts 51, 52 establishes limitations on both horizontal and vertical relative displacement of the upper member with respect to the lower member.

The jaws 13 through 16 of the lower member further limit transverse motion of the upper member by their association with the depending looping surfaces 57, 58 of the upper member. Preferably disc-like shock cushions 65, which are free to migrate a little on the horizontal restraint bolts, intervene between the end surfaces of the downwardly extending looping surfaces and the inner surfaces of the jaws.

The downwardly extending loping surfaces are strengthened by a pair of transversely separated horizontal braces 71, 72 in the upper member between the looping surfaces. The configuration of upper member 18 of the embodiment of FIGS. 1-3 is such that the member may be cast of a material such as ductile iron. It has been found that it is best to fabricate shock cushions of high quality "Neoprene" rubber such as Military Specifications require for aircraft seals and the like.

The embodiment of FIG. 4 comprises an isolator 80 that has a lower member 81 with a base plate 82 and transversely spaced, parallel flanges like the flange 83. The flanges define pairs of transversely spaced jaws 84, 84A at either end of the lower member. Horizontal restraint bolts 51, 52 are releasably secured in the flanges jaw areas, extending from flange to flange transversely of the lower member. Horizontal, cylindrical transverse shock cushions 85, 86, one about each restraint bolt, have nearly zero clearance with respect to the peripheries of the bolts, but are spaced from the upwardly opening loops 88, 89 of upper member extending looping surfaces 91, 92, respectively. The looping surfaces extend downwardly from a horizontal top plate 93 of an upper member 94 to define upwardly opening troughs about the horizontal restraint bolts and their shock cushions 85, 86. Clearance is between the shock cushions and the interior surfaces of the loops, instead of between the internal surface of the cushions and the bolt peripheries.

As in the embodiment of FIG. 1, disc-like shock cushions 65 intervene between the side walls of the downwardly extending looping surfaces of the upper member and the jaws. Transverse shock cushions 97, 98 are fixed to the lower member base plate beneath the open loops 88, 89.

The resilient column 28A of FIG. 4 is substantially similar to column 28 shown and described with respect to FIG. 3 and may be static loaded and adjusted in the same way. However, upper member 94 of FIG. 4 differs from upper member 18 of FIG. 1 in being formed of a steel stamping, or roll-formed from plate, and its transversely separated horizontal braces 99, which extend between the downwardly depending looping surfaces of the upper member, are welded to those surfaces to define a unitary structure. Apertures 25 at the longitudinal extremes of the lower member base plate afford means for attachment of the lower member to anchor bolts in the load supporting surface to which the isolator of FIG. 4 may be fixed.

The embodiment of FIGS. 5 through 7 comprises a multiple resilient support column isolator 100 having a lower member 101 with a base plate 102. The base plate extends longitudinally between and under opposite jaw channels 103 and 104. Anchor bolts such as bolts 106, 107 are lodged in apertures of the plate similar to the apertures 25 of the previously described embodiments, to secure the lower member to a load support surface. The anchor bolts also extend upwardly through the jaw channels. As can be seen from FIG. 7 each jaw channel is fixed to base plate 102, preferably by welding, and defines transversely spaced vertical jaws such as the jaws 108, 109. Horizontal restraint bolts 111, 112 are releasably secured in horizontal transverse position in the jaw pairs. Disc-like cushions 65 are associated with each restraint bolt 111, 112, as are cylindrical transverse shock cushions 61, visible in FIG. 6. An upper member 114 may be comprised of a longitudinally elongate channel 115 with depending flanges 116, 117. Downwardly extending looping surfaces 118, 119 are secured to the longitudinal extremes of upper member 114. Downwardly extending looping surface is secured to an end 114A, as by welds 121. An attachment pad 122 is welded to the opposite end 114B of the upper member and tapped holes in the pad receive fasteners 123 which removably secure downwardly extending looping surface 119 to the upper member. It is to be understood that while the embodiment of FIG. 5 is shown having two differing securing combinations for the looping surface the average vibration isolator of the invention has either one or the other securing combinations at both ends.

As in the embodiment of FIG. 4 the embodiment of FIG. 5 has downwardly extending looping surfaces with integral loops 124, 125 which define upwardly opening troughs about horizontal restraint bolts 111, 112. The isolator 100 is distinct from those of FIGS. 1 and 4 in that a plurality of resilient support columns intervene between the upper and lower isolator members. The support columns of isolator 100 are similar so the description of one suffices for all. All resilient support columns 126 have a column compression spring 127 that extends vertically between bearing cups 128 and 129 at opposite spring ends. A threaded adjustment stud 136 is secured to lower member base plate 102 by a fixed nut 142 welded to the plate. A second nut 143 on the stud contacts a bearing cup 128, which in turn supports column spring 127. The stud extends through the lower cup and terminates below upper bearing cup 129 upon which upper member 114 seats. The interval between the upper end of stud 136 and upper member 114 is clearance space.

Adjustment of static load on column springs 127 of the resilient columns 126 may be accomplished by displacement of nut 143 along stud 136 to move bearing cup 128 toward or away from column spring 127. Each of the adjustment nuts is accessible. The shock cushions are easily accessible for inspection and replacement is accomplished by the simple removal of horizontal restraint bolts 111, 112. Alternatively, downwardly extending surface 119 may be removed from upper member 114 for cushion inspection and replacement purposes.

The equipment to be protected is represented in FIGS. 5-7 by broken lines 145 and is secured to upper member 114 by common bolts 147 that extend through channel 115 and are fastened to the upper member by nuts 148. The bolts are located at spaced intervals longitudinally of the channel of upper member 114 between the vertical axes of resilient columns 126. While three columns and two common bolts 147 have been shown, some isolator installations may require two columns while other installations may require more than three, depending upon the weight and configuration of the equipment to be secured.

In FIGS. 8 and 9 the forces involved in earthquake protected vibration isolators are schematically illustrated. FIG. 8 shows the forces for an isolator in accordance with the invention wherein the vibration mounts and the locators or "snubbers" are combined in an isolator restraint combination, the lower member 151 representing the unity of the components. In FIG. 9 the "snubbers" 152 are separated from the spring vibration isolator 153 as represented by the separate base plate components 152A, 152B and 153A. In the Figures the resilient columns are shown as simple coil springs in cross section because of scale, but represent the full resilient columns as shown in the previously described Figures, including the studs and bearing cups.

In FIGS. 8 and 9 the following values are involved:
P = pullout load on anchors (lbs.)
W = Weight (lbs.)
U = Load Upward (lbs.)
S = Spring Thrust (lbs.)
c = null position clearance (inches)
d = Static Deflection of the spring (inches) [is not shown schematically but is normally many times greater than "c"].

The formulas for the schematic of FIG. 8 are:

$$P + W = U$$

$$P = U - W$$

For the schematic of FIG. 9 the formulas are:

$$P + W = U + S$$

$$S = (W[d-c]/d)$$

therefore $P = U - [c/d]W$.

Inspection of the formulas shows the lesser pullout loads on the anchors of the apparatus of the invention due to the unity of vibration isolator components and locator or "snubber" elements. Since d is normally many times greater than c, the pullout load in the apparatus of FIG. 9 is reduced by only a fraction of the weight, while in the apparatus of the invention shown in FIG. 8 the pullout load is reduced by the full weight.

In addition to the advantages of lesser pullout loads on anchors and the ease of access for inspection and maintenance, the apparatus of the invention offers versatile weight range, ease of fabrication and performance of high quality in a field where the actual needs are uncertain. While several embodiments of the invention have been shown, other configurations within the scope of the invention may occur to those skilled in this particular art. It is therefore desired that the invention be measured by the appended claims rather than by the foregoing illustrative embodiments.

I claim:

1. A vibration isolated mounting device for equipment to be secured to a load supporting surface and comprising a lower member adapted to be secured to said load supporting surface, horizontally separated pairs of spaced, parallel jaws fixed to said lower member, at least one resilient load supporting column bearing on said lower member, an upper member adapted for attachment to said equipment and bearing upon said resilient column, transversely extending horizontal restraint members secured each in a pair of jaws, a downwardly extending looping surface secured to each end of said upper member and oriented about one of said restraint members, and means for adjusting the compression load of said resilient column.

2. Apparatus in accordance with claim 1 further comprising means for releasably securing said horizontal restraint members in said jaws of a pair.

3. Apparatus in accordance with claim 1 wherein each of said downwardly extending looping surfaces defines a hollow cylinder about one of said horizontal restraint members.

4. Apparatus in accordance with claim 1 wherein each of said downwardly extending looping surfaces defines an upwardly opening trough about one of said horizontal restraint members.

5. Apparatus in accordance with claim 1 wherein said means for adjusting the compression load comprises a bearing cup on said resilient column between said column and said upper member, a threaded member threadably engaging said cup and extending through said upper member, and an adjusting nut engaging said threaded member between said bearing cup and said upper member.

6. Apparatus in accordance with claim 5 wherein said threaded member affords means for securing said equipment to said upper member.

7. Apparatus in accordance with claim 5 further comprising a second resilient column longitudinally spaced from the first resilient support column, and fasteners distinct from the said threaded members for securing said equipment to said upper member.

8. Apparatus in accordance with claim 1 wherein said means for adjusting compression load comprises a bearing cup between said resilient support column and said lower member, a threaded stud secured at one end to said lower member, an adjustment nut on said threaded stud between said lower member and said bearing cup adapted to bear on said cup and load said resilient support column.

9. Apparatus in accordance with claim 8 further comprising a second resilient supporting column, means for adjusting the compression load on said second support column, and means for securing said equipment to said upper member, said securing means being located on said upper member between adjacent resilient columns.

10. Apparatus in accordance with claim 1 wherein each horizontal restraint member is encirled by a shock cushion means that is normally spaced from the periphery of said restraint member.

11. Apparatus in accordance with claim 1 further comprising each shock cushion means intervening between a horizontal restraint member and a downwardly extending looping surface is normally spaced from said looping surface.

12. Apparatus in accordance with claim 1 wherein each of said downwardly extending looping surfaces is detachably secured to said upper member at an end of said member.

13. Apparatus in accordance with claim 1 further comprising shock cushion means intervening between the periphery of each restraint member and the looping surface oriented thereabout.

14. Apparatus in accordance with claim 13 further comprising shock cushion means intervening between said jaws of a pair and said downwardly extending looping surface.

15. Apparatus in accordance with claim 13 wherein each of said downwardly extending looping surfaces defines a hollow cylinder about one of said horizontal restraint members.

16. Apparatus in accordance with claim 13 wherein each of said downwardly extending looping surfaces defines an upwardly opening trough about one of said horizontal restraint members.

17. Apparatus in accordance with claim 13 further comprising a second resilient supporting column, means for adjusting the compression load on said second column, and means for securing said equipment to said upper member.

* * * * *